United States Patent
Bakar

(10) Patent No.: US 9,282,371 B2
(45) Date of Patent: *Mar. 8, 2016

(54) SYSTEMS, METHODS, AND MEDIA FOR MANAGING AN ENTERTAINMENT SYSTEM

(71) Applicant: Google Inc., Mountain View, CA (US)

(72) Inventor: Majd Bakar, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,543

(22) Filed: Mar. 30, 2015

(65) Prior Publication Data

US 2015/0208128 A1    Jul. 23, 2015

Related U.S. Application Data

(63) Continuation of application No. 13/804,087, filed on Mar. 14, 2013, now Pat. No. 9,009,458.

(51) Int. Cl.
| | | |
|---|---|---|
| H04N 21/462 | (2011.01) |
| G06F 9/445 | (2006.01) |
| H04N 7/16 | (2011.01) |
| H04L 12/28 | (2006.01) |
| H04N 5/60 | (2006.01) |
| H04N 21/436 | (2011.01) |
| H04N 21/439 | (2011.01) |
| H04N 21/41 | (2011.01) |
| H04N 21/4363 | (2011.01) |
| H04N 21/442 | (2011.01) |

(Continued)

(52) U.S. Cl.
CPC ............ *H04N 21/4622* (2013.01); *G06F 9/445* (2013.01); *H04L 12/281* (2013.01); *H04L 12/2805* (2013.01); *H04L 12/2827* (2013.01); *H04N 5/60* (2013.01); *H04N 7/163* (2013.01); *H04N 21/4104* (2013.01); *H04N 21/4135* (2013.01); *H04N 21/42607* (2013.01); *H04N 21/439* (2013.01); *H04N 21/43615* (2013.01); *H04N 21/43632* (2013.01); *H04N 21/44227* (2013.01); *H04N 21/482* (2013.01); *H04N 21/42204* (2013.01)

(58) Field of Classification Search
CPC .......... H04N 7/17318; H04N 21/4126; H04N 5/44543; H04N 7/163; H04N 21/42204
See application file for complete search history.

(56) References Cited

U.S. PATENT DOCUMENTS

| | | |
|---|---|---|
| 6,704,929 B1 | 3/2004 | Ozer et al. |
| 2004/0046677 A1 | 3/2004 | Dresti et al. |

(Continued)

FOREIGN PATENT DOCUMENTS

| | | |
|---|---|---|
| EP | 2262252 | 12/2010 |
| EP | 2485484 | 8/2012 |

OTHER PUBLICATIONS

"High-Definition Multimedia Interface. Specification Version 1.4", Mar. 23, 2010, pp. 1-250, available at: http://wenku.baidu.com/view/e7db77d184254b35eefd34d0.html.

(Continued)

*Primary Examiner* — Farley Abad
(74) *Attorney, Agent, or Firm* — Byrne Poh LLP

(57) ABSTRACT

Systems, methods, and media for managing an entertainment system are provided. In some implementations, systems for managing an entertainment system are provided, the systems comprising: at least one hardware processor configured to: detect a first instruction; select a component of the entertainment system; determine a first state of the component; store an indication of the first state; detect a second instruction; retrieve the indication of the first state; generate a third instruction based on the indication of the first state; and transmit the third instruction to the component of the entertainment system.

21 Claims, 5 Drawing Sheets

(51) Int. Cl.
*H04N 21/482* (2011.01)
*H04N 21/426* (2011.01)
*H04N 21/422* (2011.01)

(56) References Cited

U.S. PATENT DOCUMENTS

2004/0266419 A1 12/2004 Arling et al.
2007/0061748 A1 3/2007 Hirose
2009/0282455 A1 11/2009 Bell et al.
2011/0015985 A1 1/2011 Curtis
2012/0174163 A1 7/2012 Moorthy et al.

OTHER PUBLICATIONS

International Search Report and Written Opinion of the International Search Authority dated Jun. 25, 2014 in International Patent Application No. PCT/US2014/024327.
Notice of Allowance dated Dec. 15, 2014 in U.S. Appl. No. 13/804,087.
Office Action dated Apr. 28, 2014 in U.S. Appl. No. 13/804,087.
Office Action dated Sep. 8, 2014 in U.S. Appl. No. 13/804,087.

SYSTEMS, METHODS, AND MEDIA FOR MANAGING AN ENTERTAINMENT SYSTEM

CROSS REFERENCE TO RELATED APPLICATIONS

This application is a continuation of U.S. patent application Ser. No. 13/804,087, filed Mar. 14, 2013, which is hereby incorporated by reference herein in its entirety.

TECHNICAL FIELD

The disclosed subject matter relates to methods, systems, and media for managing an entertainment system.

BACKGROUND

Entertainment systems may be used to watch TV, listen to music, or consume any other suitable type of media content. Some entertainment systems may include source components and rendering components. For example, the source components may be tuners and various media players that are configured to provide the rendering components with audio and/or video signals to render. The rendering components, as another example, may be TV sets, home theater receivers, amplifiers, and other devices that are configured to produce sound or video.

Switching between different source components of an entertainment system may be cumbersome at times. For example, if a user wants to switch from watching over-the-air TV to watching a Blu-ray disk, the user may need to execute multiple commands such as: change an active signal source of a TV set to a Blu-ray player; turn the Blu-ray player on; and change the volume of the TV set according to sound levels output by the Blu-ray player, so that the volume is neither too loud nor too quiet when the Blu-ray disk starts playing. Afterwards, if the user wants to resume watching TV, he or she may need to again execute multiple commands that reverse the effects of the previous commands and cause the TV set to display over-the-air TV again. However, such commands may need to be entered by the user manually, via a remote control, and this may be inconvenient for the user.

Accordingly, the need exists for new systems, methods, and media for managing an entertainment system.

SUMMARY

Systems, methods, and media for managing an entertainment system are provided. In some implementations, systems for managing an entertainment system are provided, the systems comprising: at least one hardware processor configured to: detect a first instruction; select a component of the entertainment system; determine a first state of the component; store an indication of the first state; detect a second instruction; retrieve the indication of the first state; generate a third instruction based on the indication of the first state; and transmit the third instruction to the component of the entertainment system.

In some implementations methods for managing an entertainment system are provided, the methods comprising: detecting a first instruction; selecting a component of the entertainment system; determining a first state of the component using at least one hardware processor; storing an indication of the first state; detecting a second instruction; retrieving the indication of the first state; generating a third instruction based on the indication of the first state; and transmitting the third instruction to the component of the entertainment system.

In some implementations, non-transitory computer-readable media containing computer-executable instructions that, when executed by a processor, cause the processor to perform a method for managing an entertainment system are provided, the method comprising: detecting a first instruction; selecting a component of the entertainment system; determining a first state of the component; storing an indication of the first state; detecting a second instruction; retrieving the indication of the first state; generating a third instruction based on the indication of the first state; and transmitting the third instruction to the component of the entertainment system.

In some implementations, systems for managing an entertainment system are provided, the systems comprising: means for detecting a first instruction; means for selecting a component of the entertainment system; means for determining a first state of the component; means for storing an indication of the first state; means for detecting a second instruction; means for retrieving the indication of the first state; means for generating a third instruction based on the indication of the first state; and means for transmitting the third instruction to the component of the entertainment system.

In some implementations of these systems, the means for detecting the first instruction detects an instruction which, when executed, causes the component to stop being in the first state.

In some implementations of these systems, the systems further comprise means for selecting the component based on the component being an active signal source for a rendering component of the entertainment system when the first instruction is detected.

In some implementations of these systems, the means for determining a first state of the component: transmits a query over a communications bus; and receives an indication of a configuration setting of the component in response to the query.

In some implementations of these systems, the means for detecting the second instruction detects an instruction to return the component to the first state.

In some implementations of these systems, the third instruction is for restoring a configuration setting of the component to a value the configuration setting was set to when the first instruction was detected.

In some implementations of these systems, the means for transmitting the third instruction transmits the third instruction over a communications bus.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

In some implementations, mechanisms (which may include methods, systems, and media) are provided for managing an entertainment system (ES). When a command to change the state of one or more component(s) of an entertainment system is detected, the mechanisms may record the state of the component(s) of the entertainment system (ES) and automatically restore that state at a later time.

For example, consider an example in the context of an entertainment system that includes a TV set, a DVD player, and a cable TV set-top box. At an initial point in time, a user may be watching a television program on the TV via the cable TV set-top box. In response to a user issuing a command to watch a movie on the DVD player (e.g., by placing a DVD in the DVD player), the mechanisms may determine the input source setting of the TV and the channel setting of the cable TV set-top box and store that information prior to those settings being changed as a result of the command and/or some other function (e.g., such as the cable TV set-top box's digital video recorder function). When the user indicates that the user no longer wants to watch the movie (e.g., by issuing a command to power-off the DVD player), the mechanisms may automatically switch the input source setting of the TV back to the cable TV set-top box and set the channel setting on the cable TV set-top box back to the channel that was previously being watched.

Figure 1:
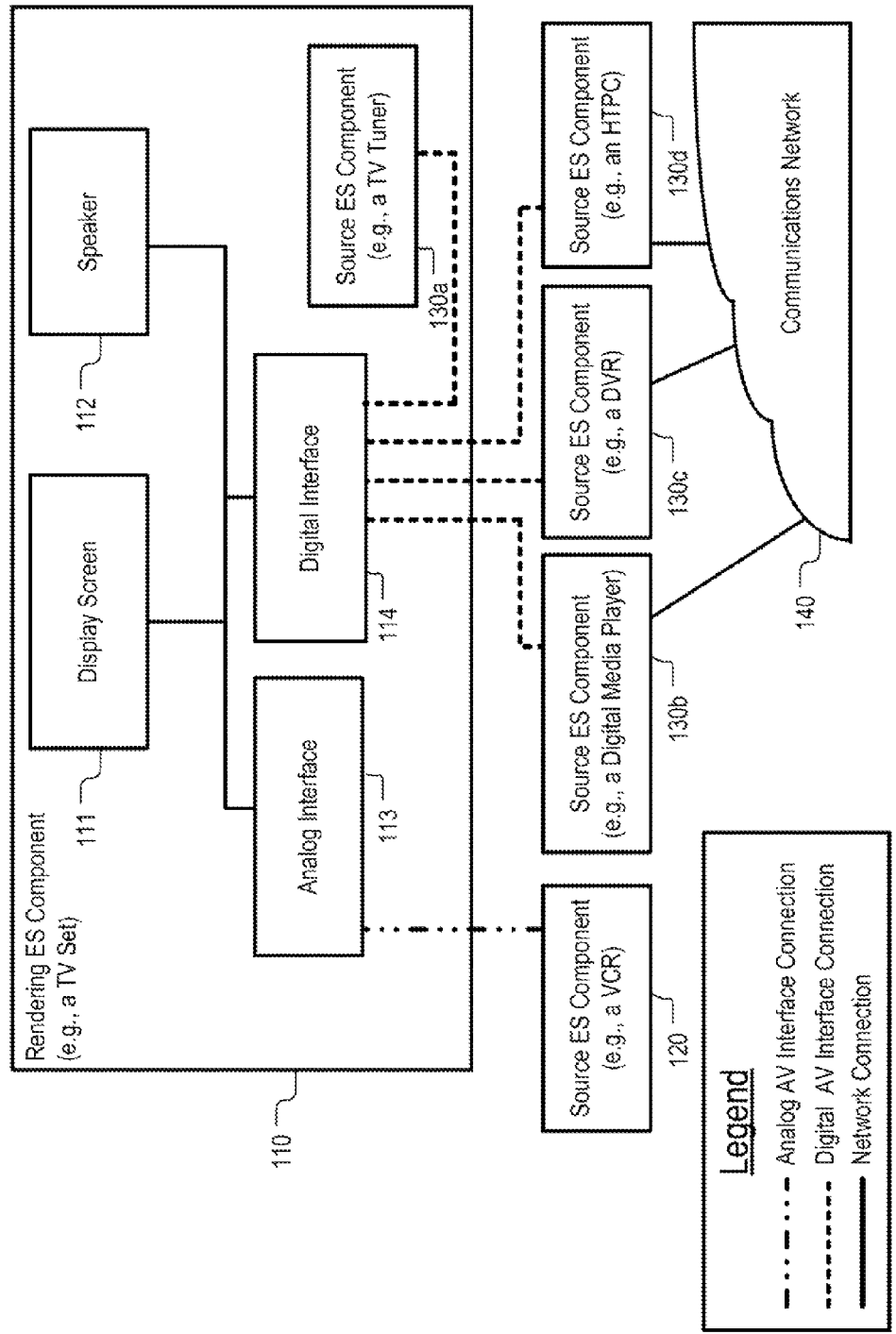
FIG. 1 is an example of an entertainment system in accordance with some implementations of the disclosed subject matter.

FIG. 1 is an example of a diagram of an entertainment system (ES) 100 in accordance with some implementations of the disclosed subject matter. As illustrated, entertainment system 100 may include a rendering ES component 110. Rendering ES component 110 may be a TV set and it may include a display screen 111 and a speaker 112. Although display screen 111 and speaker 112 are depicted as being integrated in ES component 110, in some implementations display screen 111 and/or speaker 112 may be external to ES component 110. Additionally or alternatively, in some implementations, ES component 110 may include only one (or none) of screen 111 and speaker 112. Although ES component 110 is a TV set in this example, in other examples, ES component 110 may be any suitable device that is capable of producing sound and/or video, or a sound and/or a video signal, such as a stereo amplifier, a home theater receiver, or a projector.

ES component 110 may include an analog interface 113 and a digital interface 114. Analog interface 113 may include circuitry and/or one or more ports (external or internal) for receiving analog video and/or audio signals from source ES components, such as CD players, DVD players, or TV set-top boxes. In some implementations, analog interface 113 may include an analog audio-video (AV) switch. Analog interface 113 may be connected to an ES component 120, which, for example, may be a videocassette recorder (VCR).

Digital interface 114 may include circuitry for receiving video and/or audio signals from various source ES components. In some implementations, digital interface 114 may include one or more external or internal input ports. Additionally or alternatively, in some implementations, digital interface 114 may include a digital AV switch (e.g., an HDMI switch) for multiplexing a plurality of input ports that are part of digital interface 114. Digital interface 114 may be a Home Digital Multimedia Interface (HDMI), a Wireless Home Digital Interface (WHDI), an HDBaseT interface, a Digital Interactive Interface for Video and Audio (DiiVA), or any other suitable type of digital interface for receiving audio and/or video.

As illustrated in FIG. 1, digital interface 114 may be coupled to source ES components 130a-d. For example, ES component 130a may be a tuner that is integrated in rendering ES component 110. ES component 130b may be a digital media player that is external to ES component 110. ES component 130c may be a digital video recorder (DVR) that is external to ES component 110. ES component 130d may be a home theater personal computer (HTPC) that is external to ES component 110. Any suitable number and types of source ES components can be used in some implementations.

Figure 2:
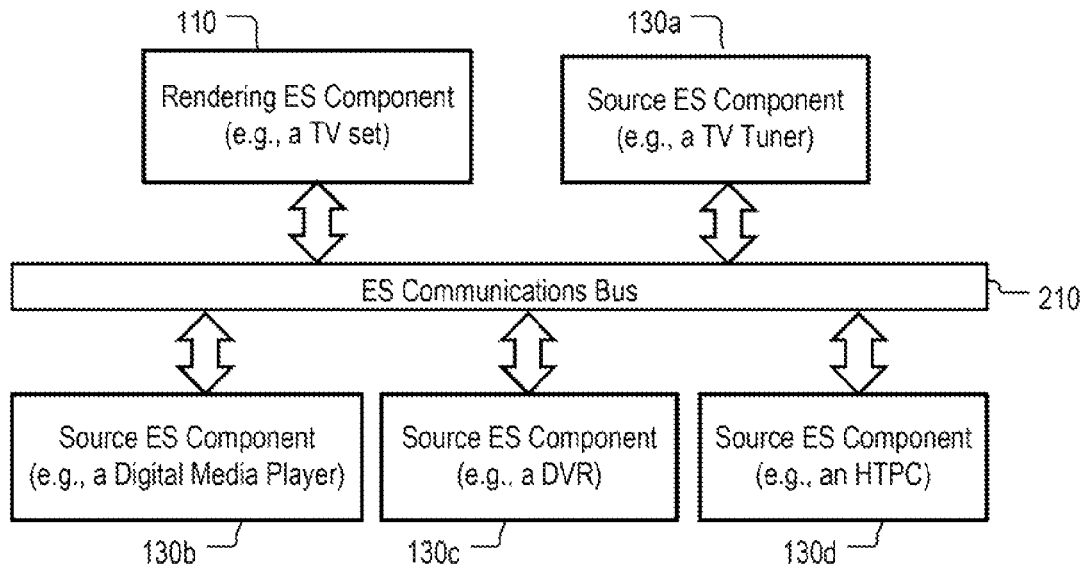
FIG. 2 is an example of a communications bus connecting different components of an entertainment system in accordance with some implementations of the disclosed subject matter.
Figure 3:
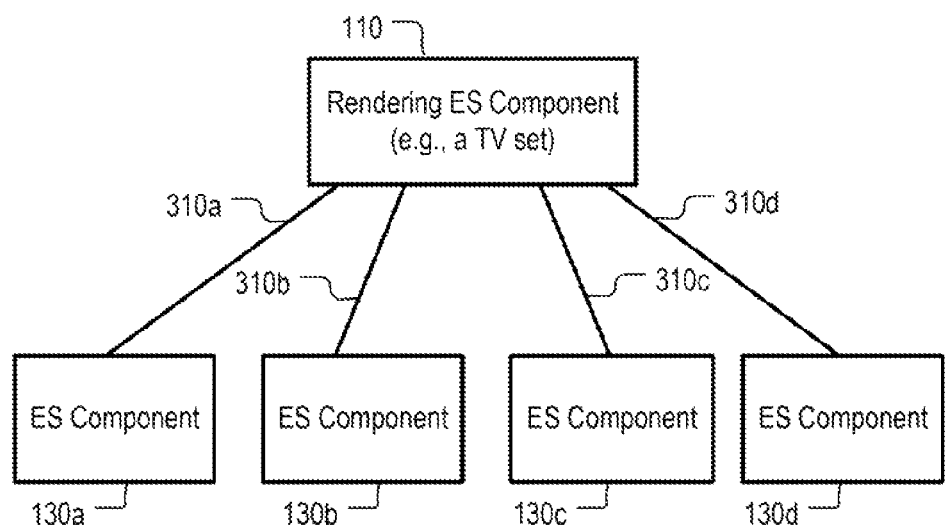
FIG. 3 is an example of a topology for a communications bus connecting different components of an entertainment system in accordance with some implementations of the disclosed subject matter.

Digital interface 114, in some instances, may implement (at least in part) a communications bus 210 (shown in FIG. 2) that connects ES components 130a-d to ES component 110. Communications bus 210 may be a Consumer Electronics Control (CEC) bus or any other suitable communications bus. As illustrated in FIG. 3, in some implementations, the topology of communications bus 210 may be an inverted tree with ES component 110 (or an AV switch that is part ES component 110) being the tree's root and ES components 130a-d being leaf nodes. Each leaf node, for example, may be connected to the root via one of signal paths 310a-d. In some implementations, communications bus 210 may be implemented as part of an AV interface connecting ES components 130a-d to ES component 110. For example, communications bus 210 may be a CEC bus which may be physically integrated in AV interfaces, such as HDMI. Alternatively, communications bus 210 may be separate from any AV interface. As noted above, an AV interface may be any interface for transmitting or receiving audio and/or video content.

Entertainment system 100 may also include a communications network 140. Network 140 may be a local area network (LAN), a wireless network (e.g., a WiFi network, a WiMax network, etc.), a wide area network (WAN), a mobile telephone network, a mobile data network (e.g., such as a 3G network or a 4G network), a satellite network, a cable network, a telephone network, the Internet, or any other suitable network. In some implementations, ES components 130b-d may be connected to one another via network 140.

In some implementations, rendering ES component 110 may be configured to switch between ES components 120 and 130a-d by using one or more AV switches that are part of AV interface 113, AV interface 114, and/or additional circuitry that is part of ES component 110. More particularly, rendering component 110 may multiplex source signals received from ES components 120 and 130a-d to select at least one of them. The selected source signal may then be propagated to display screen 111 or speaker 112 for presentation. Source signals that are not selected may not be propagated for presentation.

Selecting a signal, in some implementations, may include selecting an active input port out of a plurality of input ports (logical or physical) that are part of ES component 110. In some implementations, ES component 110 may have only one active input port. Alternatively, in some implementations, ES component 110 may have multiple active input ports.

In some implementations, any signal received over an active input port of ES component 110 may be forwarded to at least one of display screen 111 or speaker 112 for output by switching circuitry that is part of ES component 110. Put differently, in some implementations, when an AV switch, or other switching circuitry of ES component 110, is configured to forward a signal received from one of a plurality of input ports of the switch (or other circuitry) out of an output port of the switch (or other circuitry) and towards one of a display screen 111 and/or speaker 112, that port may be considered to be an active input port for ES component 110. As noted above, the port may be either physical or logical.

In some instances, a source ES component that is connected to an active input port of ES component 110 may be termed to be an active signal source for ES component 110. For example, when a user of entertainment system 110 is watching over-the-air TV using ES component 130a, ES component 130a may be an active input source for ES component 110 and the port on ES component 110 to which ES component 130a is connected (e.g., an internal HDMI port) may be an active input port. When the user switches from watching over-the-air TV to watching streamed media content, ES component 130b may become an active input source for ES component 110, whereas ES component 130a may stop being an active input source for ES component 110. Similarly, the input port on ES component 110 to which ES component 130b is connected may become an active input port, whereas the port to which ES component 130a is connected may become inactive.

In some implementations, an active input port on ES component 110 and/or an active signal source for ES component 110 may be changed via one or more instructions. In some implementations, the instructions may be directed to ES component 110. Additionally or alternatively, the instructions may be directed to the ES component that is to become an active signal source (e.g., ES component 130b). The instructions may be transmitted over at least one of: an infrared (IR) port; communications bus 210; network 140; and any other suitable type of channel. By way of example, the instructions may include a "change source" instruction, which is found on most TV sets, or instruction or a "power on" instruction. In some implementations, when ES component 130b is activated via a "power on" instruction, ES component 130b may transmit one or more other instructions over communications bus 210 that will cause ES component 110 to select the input port where ES component 130b is connected as an active input port. In some implementations, ES components may automatically become active signal sources for rendering ES component 110 when they are powered on.

In some implementations, any of ES components 110, 120, and 130a-d may execute operating system software (e.g., firmware, a multi-tasking operating system, etc.) as well as additional software applications. For example, ES component 130b may execute an operating system and a software application for streaming audio and/or video content from an online source (via network 140). As another example, ES component 130a may execute firmware for receiving HDTV signals over the airwaves and decoding the received signals. Any suitable software may be executed on ES components 110, 120, and 130a-d, in some implementations.

Furthermore, any one of ES components 110, 120, and 130a-d may be associated with a configuration setting. By way of example, the configuration setting of a respective ES component may be: a variable; a location in a memory of the respective ES component (e.g., a location in RAM, a location in a solid state drive (SSD), etc.); a field in a table; a data structure; or any other suitable type of item. In addition, the configuration setting may have a value. The value of the configuration setting may be: a bit string; a number; an alpha-numerical string; or any other suitable type of indication. In some implementations, the value of the configuration setting may be stored on the respective ES component. Additionally or alternatively, in some implementations, the value of the configuration setting may determine and/or indicate an aspect of the operation of the respective ES component. Thus, in some implementations, changing the value of the configuration setting may cause a state of the respective ES component to change.

In some implementations, the configuration setting may be an audio configuration setting and it may determine (or indicate) a characteristic of audio that is output by the respective ES component. By way of example, audio configuration settings may determine (or indicate) at least one of: a volume level setting; a bass level setting; a treble level settings, an audio surround mode (e.g., 5.1, 2.1, stereo); or any other suitable characteristic of audio that is output by the respective ES component. Additionally or alternatively, in some implementations, the configuration setting may be a video configuration setting and it may determine (or indicate) a characteristic of video that is output by the respective ES component. By way of example, video configuration settings may determine (or indicate) at least one of: a brightness level; a contrast level; a screen refresh rate; a color hue; a color saturation; a color depth; a screen mode (e.g., dual screen mode, a single screen mode, or a multi-screen mode); a screen resolution; or any other suitable characteristic of video that is output by the respective ES component.

Additionally or alternatively, in some implementations, the configuration setting may be a channel configuration setting and it may determine (or indicate) a channel at which a signal is to be or is being received or output. The channel may be: an input channel; an output channel; a TV channel; a frequency spectrum channel; or any other suitable type of channel. The signal may be: a control signal (e.g., an IR signal generated by a remote control or HDMI command); a video signal; an audio signal; or any other suitable type of signal. When the signal is a control signal, it may be any type of signal that causes the respective ES component to change states. By way of example, channel configuration settings may determine (or indicate) at least one of: a TV channel that is currently being played on a TV set; an active input port on the respective ES component; an output port over which a signal (audio and/or video signal) is to be or is being transmitted; a port (logical or physical) over which a control signal is to be or is being received (e.g., IR input port, a network port, or an HDMI port); or any other suitable characteristic of a conduit or channel over which a signal is to be or is being received or transmitted by the respective ES component.

Additionally or alternatively, in some implementations, the configuration setting may be a software configuration setting and it may pertain to the operation of software (e.g., firmware, operating system software, or application software) that is executed on the respective ES component. By way of example, channel configuration settings may determine (or indicate) at least one of: an application that is currently being executed by the respective ES component; a screen resolution used by an application or an operating system; a rate at which a given process or application is scheduled by a processor of the respective ES component; whether to perform automatic updates; or any other suitable software characteristic.

Additionally or alternatively, in some implementations, the configuration setting may be a power setting. By way of example, power settings may determine or indicate at least one of: whether the respective ES component is powered on; whether the respective ES component is in a power savings mode; a number of CPU cores that are enabled on the respective ES component; a backlight brightness level; or any other suitable setting related to power consumption. It should be noted that the configuration settings and categories thereof are provided as examples only. Any suitable configuration setting may be used in some implementations.

In some implementations, any of ES components 110, 120, and 130*a-d* may be configured to report the value of at least one of its configuration settings in response to a query. For example, the query may be transmitted over a communications bus, such as communications bus 210. Additionally or alternatively, the query may be transmitted over a communications network, such as network 140.

In some implementations, any of ES components 110, 120, and 130*a-d* may be configured to receive a control instruction over communications bus 210. The control instruction, when executed by the ES component, may cause the ES component to leave one state and enter another state. The state change may include: a powering off/on of the ES component; a change in sound volume; a change in screen resolution; or a change in any other aspect of the operation of the ES component. Specifically, for example, in some implementations, the control instruction may result in a current value of a configuration setting of the ES component being substituted (e.g., overwritten) with a new value. As noted, changing the value of a configuration setting of an ES component may result in changing one or more aspects of the operation of the ES component. Thus, changing the value of a configuration setting of an ES component may be one way to change a state of that component.

Figure 4:
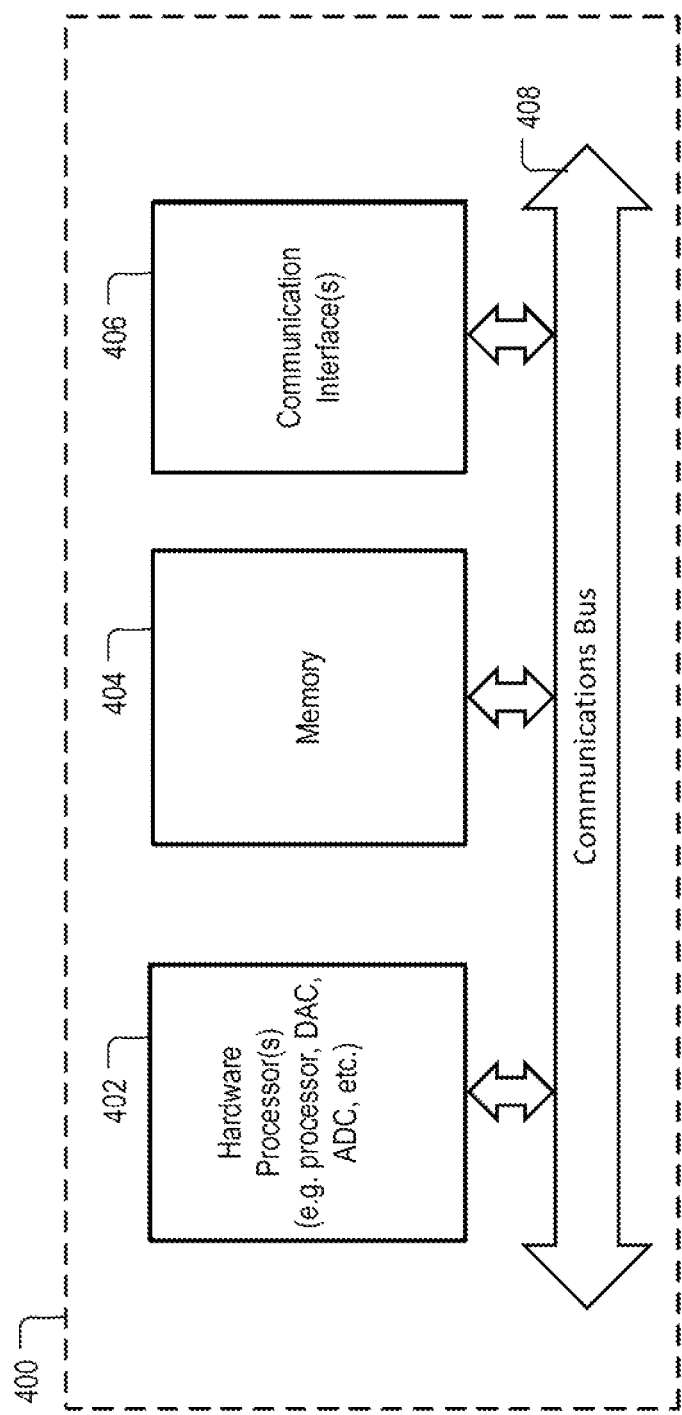
FIG. 4 is a block diagram of an example of hardware for different entertainment system components in accordance with some implementations of the disclosed subject matter.

In accordance with some implementations, any suitable hardware and/or software can be used to implement any one of the components of entertainment system 100, such as ES components 110, 120, and 130*a-d*. As illustrated in FIG. 4, for example, in some implementations, any of these components can be implemented with hardware 400, which can include hardware processor(s) 402, memory 404 communication interface(s) 406, and communications bus 408. Hardware processor(s) 402 can be any suitable hardware processor(s), such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or a supercomputer, in some implementations. Memory 404 may be any volatile or non-volatile memory (e.g., RAM, a solid state drive (SSD), or a hard disk). Communications interface(s) 406 can include one or more communications network adapters and interface(s) 406 can enable the hardware and/or software to communicate with other communications networks (e.g., such as the Internet, wired networks, wireless networks, etc.), other equipment, and/or any other suitable networks, devices, etc. Communications bus 408 may include a front side bus (FSP), a computer expansion bus, or any other suitable bus for connecting to electronic components (e.g., computer components) to hardware processor(s) 402.

Figure 5:
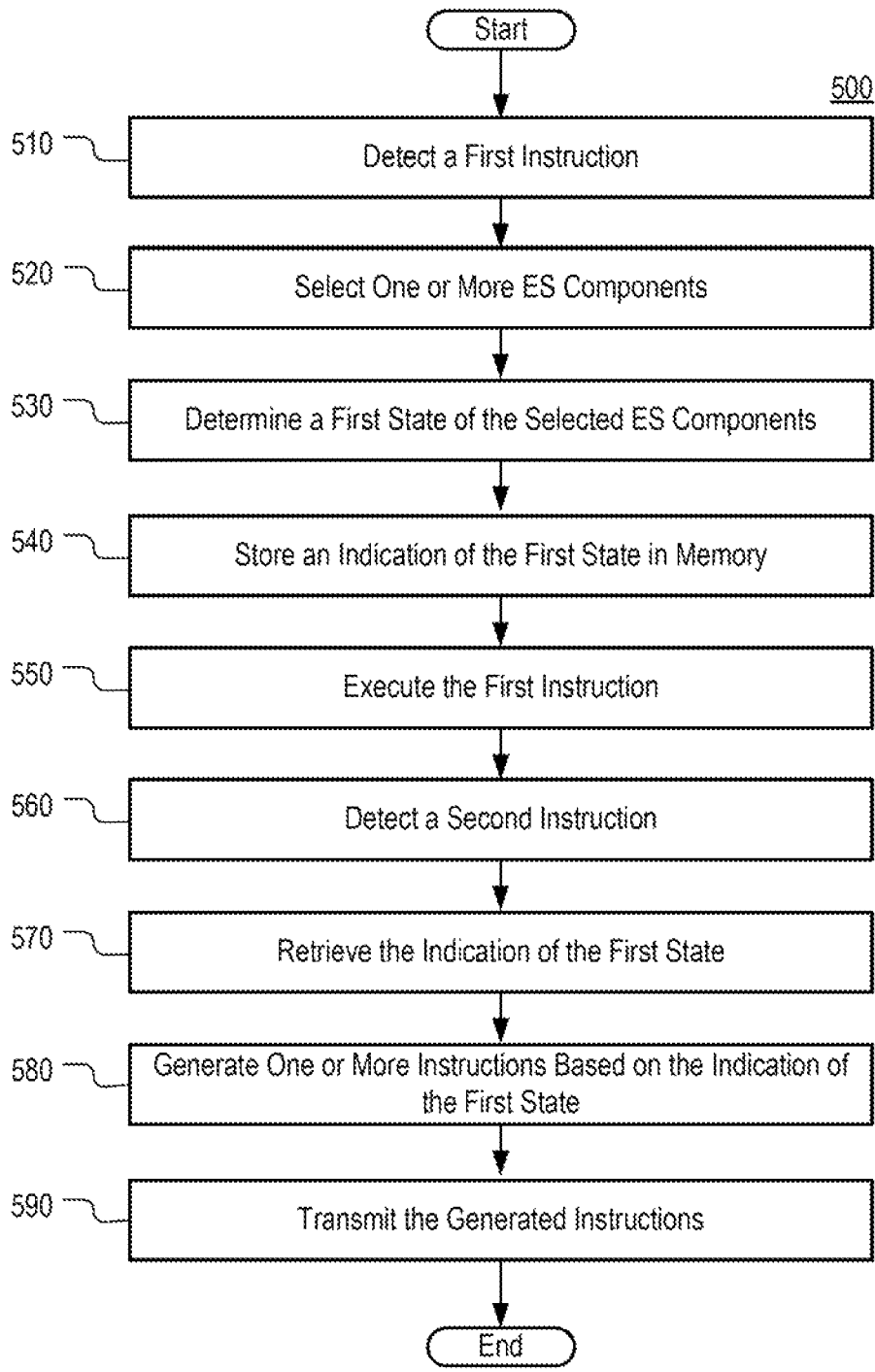
FIG. 5 is a flowchart of an example of a process for managing an entertainment system in accordance with some implementations of the disclosed subject matter.

FIG. 5 is a flowchart of an example of a process 500 for controlling the state of an entertainment system in accordance with some implementations of the disclosed subject matter. The entertainment system may be any suitable entertainment system, such as system 100. Process 500 may be executed by ES component 130*b* or any other suitable component of system 100. More particularly, for example, in some implementations, the steps in process 500 may be executed by hardware processor(s) that are part of the ES component executing process 500.

At 510, process 500 detects a first instruction relating to an ES component. The first instruction may be any suitable instruction. For example, the first instruction may be an instruction that, if executed, would cause a source ES component to become an active signal source for a rendering ES component.

In some implementations, in order for the source ES component to become an active signal source for the rendering ES component, the source ES component may need to be powered on. Additionally or alternatively, in some implementations, in order for the source ES component to become an active signal source for the rendering ES component, the input port on the rendering ES component to which the source ES component is connected may need to be selected as an active input port by switching circuitry that is part of the rendering ES component (e.g., an HDMI switch). Thus, for example, the first instruction may be a "power on" instruction and/or a "change input" instruction.

The first instruction may be transmitted to the source ES component, the rendering ES component, or any other suitable component of an entertainment system. In instances where the first instruction is directed to an entertainment system component other than the source ES component, the source ES component may detect the first instruction by monitoring communications on a communications bus to which the entertainment system component is coupled.

In some implementations, a detected instruction may be identified as a first instruction by comparing an identifier for the detected instruction to a list of one or more first instructions. The list of one or more first instructions may include any suitable instructions. For example, the list of one or more first instructions may include instructions that are expected to result in a source ES component becoming an active signal source for a rendering ES component. The list may be stored in any suitable location, such as a memory of a source ES component.

At 520, the source ES component selects one or more other components of the entertainment system. In some implementations, the other ES component(s) may be selected based on at least one of: a type of the selected ES component (e.g., based on it being a rendering ES component or based on it being a source ES component); a state of the selected component (e.g., based on it being the active signal source for a given rendering ES component); whether the component is connected to a communications bus, such as communications bus 210; and/or any other suitable criterion.

For example, in some implementations, the selected components may be identified by transmitting to the rendering ES component, or to another ES component connected to a communications bus, one or more queries that request identification of at least one of: an active signal source for the rendering ES component; and/or an active input port on the rendering ES component. In some implementations, the source ES component may exchange communications, over a communications bus, with other components of an entertainment system in order to identify one or more ES components that meet one or more of the predefined criteria for selection.

At 530, the source ES component determines a first state of the selected ES component(s). In some implementations, determining the first state may include receiving value(s) of one or more configurations settings of the entertainment system component(s). The configuration setting(s) may be: audio configuration setting(s); video configuration setting(s); channel configuration setting(s); power configuration setting(s); software configuration setting(s); or any other suitable type of configuration setting(s). As discussed above, configuration setting(s)' values may be determined by transmitting queries to the selected ES component(s) over a communications bus. In some implementations, a source ES component may determine the first state in advance of detecting the first instruction. Additionally or alternatively, in some implementations, the source ES component may repeatedly (e.g., periodically) query the ES components selected at step 520 in order to maintain a current record of the first state.

At 540, an indication of the first state is stored in memory. The memory may be: a volatile memory (e.g., RAM); a non-volatile memory (e.g., a solid state drive (SSD)), a remote memory (e.g., a remote storage server); and/or any other suitable type of memory. In some implementations, storing the indication in memory may include storing indications of the value(s) of configuration setting(s) of the selected ES component(s) that may be received at step 530.

At 550, the first instruction is executed. Any suitable effect may result upon executing the first instruction. For example, the source ES component may become the active signal source for the rendering ES component.

At 560, the source component ES detects a second instruction. The second instruction may to the source ES component, the rendering ES component, or any other suitable component of an entertainment system. The second instruction may be any suitable instruction. For example, the second instruction may be an instruction that, if executed, would cause the source ES component to stop being the active signal source for the rendering ES component. In some implementations, in order for the source ES component to stop being an active signal source for the rendering ES component, the source ES component may need to be powered off. Additionally or alternatively, in some implementations, in order for the source ES component to stop being an active signal source for the rendering ES component, the input port on the rendering ES component to which the source ES component is connected may need to be set to an inactive state. Accordingly, and for example, the second instruction may be any instruction that results, either directly or indirectly, in: the source ES component being powered off; and/or an active input port on the rendering ES component being set to an inactive state. The second instruction may be any instruction being transmitted to the source ES component, the rendering ES component, and/or any other suitable component of the entertainment system.

In instances where the second instruction is directed to an entertainment system component other than the source ES component, the source ES component may detect the second instruction by monitoring communications on a communications bus.

In some implementations, a detected instruction may be identified as a second instruction by comparing an identifier for the detected instruction to a list of one or more second instructions. The list of one or more second instructions may include any suitable instructions. For example, the list of one or more second instructions may include instructions that are expected to result in a source ES component stopping to be an active signal source for a rendering ES component. The list may be stored in any suitable location, such as a memory of the source ES component.

At 570, the indication of the first state is retrieved from memory.

At 580, one or more instructions for at least one of the ES components selected at step 520 are generated. The generated instructions may be based on the indication of the first state. The generated instructions may instruct the system components to enter a second state. The second state may be a state that is the same as the first state or a state that is determined based on the first state.

For example, in some implementations, an instruction may be generated that sets the value of a configuration setting of one of at least one of the ES components selected at step 520 to one of: the value for the same configuration setting that is received at step 530; and a value that is determined based on the value for the same configuration setting that is received at step 530. As noted, the configuration setting may be: an audio configuration setting; a video configuration setting; a channel configuration setting; a software configuration setting; a power configuration setting; or any other suitable type of configuration setting. Additionally or alternatively, in some implementations, the generated instruction(s) may cause: a change in the sound volume of an ES component; a change of the TV channel to which an ES component is tuned; a change of an active input port of an ES component; a change in the screen resolution of an ES component; or a change of any other suitable characteristic of the operation of an ES component.

At 590, the generated instruction(s) are transmitted to the one or more selected system components. The transmission may take place over a communications bus, a network, or any other suitable channel. For example, in some implementations, some of the instructions may be transmitted over communications bus 210, whereas others may be transmitted over network 140.

The first and second instructions, detected at steps 510 and 560, respectively, and the generated instruction(s) may be of the same type. Alternatively, at least some of the instructions may be of different types. For example, the first instruction may be a remote control instruction that is received over an IR port, the second instruction may be an HDMI (or CEC) instruction, and the generated instruction may also be HDMI (or CEC) instructions. Additionally or alternatively, in some implementations, the transmission (and/or generation) of the generated instruction(s) may be triggered by the detection of the second instruction.

Figure 6:
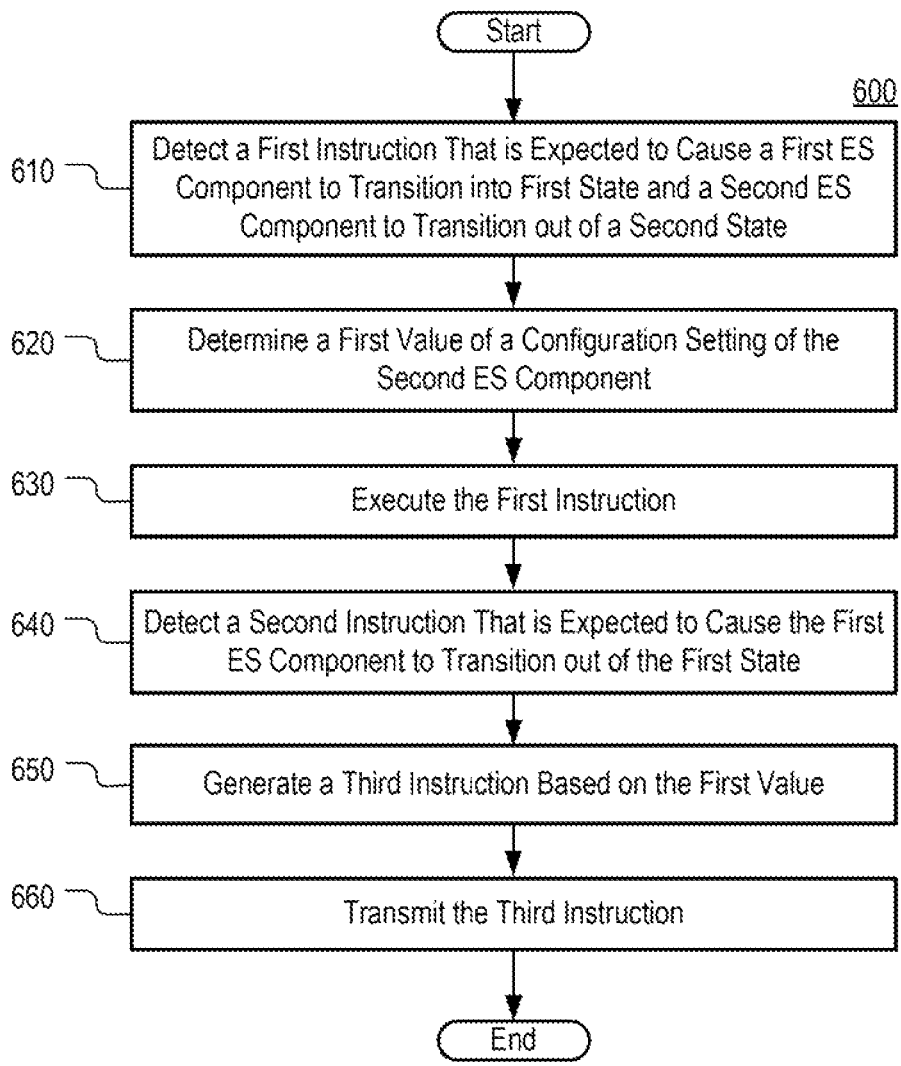
FIG. 6 is a flowchart of another example of a process for managing an entertainment system in accordance with some implementations of the disclosed subject matter.

FIG. 6 is a flowchart of another example of a process 600 for controlling the state of an entertainment system in accordance with some implementations of the disclosed subject matter. The entertainment system may be any suitable entertainment system, such as system 100. Process 600 may be executed by ES component 130a or any other component of system 100. More particularly, for example, in some implementations, the steps in process 600 may be executed by hardware processor(s) that are part of the ES component executing process 600.

At 610, process 600 detects a first instruction relating to an ES component. The first instruction may be any suitable one or more instructions. For example, the first instruction may be an instruction that, if executed, would cause a first source ES component in an entertainment system to enter a first state while causing a second component of the entertainment system to exit a second state. The second ES component may be a rendering ES component or another source ES component that is connected to the same rendering ES component as the first source ES component.

In some implementations, entering a state by an ES component may include changing any aspect of the operation of the ES component, such as: powering on the ES component; turning up the volume of the ES component; changing the TV channel to which the ES component is tuned; or starting an application on the ES component. As another example, exiting a state by an ES component may include changing any aspect of the operation of the ES component, such as: powering off the ES component; turning down the volume of the ES component; changing the TV channel to which the ES component is tuned; or closing an application on the ES component.

More particularly, for example, a first instruction may be any instruction capable of causing a change in the operation of both a first source ES component and a second source ES component. For example, the first instruction may be an instruction for powering-on the first ES component (e.g., a "power-on" instruction). Upon receiving the first instruction, the first ES component may reconfigure an AV switch inside a rendering ES component (e.g., by transmitting one or more CEC instructions over a communications bus) to become the active signal source for the rendering ES component. Subsequently, upon having its active signal source changed, the rendering ES component may power down or otherwise bring the second source ES component to an idle state. Thus, the first instruction may be any instruction that, either directly or indirectly, can cause a change in: a state of the first source ES component; and a state of the second source ES component. Furthermore, in some implementations, the first instruction may be an instruction which when executed would cause the first source ES component to become an active signal source for the rendering ES component, while causing the second source ES component to stop being an active signal source for the rendering ES component.

The first instruction may be transmitted to the first source ES component, the rendering ES component, or any other suitable component of the entertainment system. In instances where the instruction is directed to an entertainment system component other than the first source ES component, the first source ES component may detect the instruction by monitoring communications on a communications bus.

In some implementations, a detected instruction may be identified as a first instruction by comparing an identifier for the detected instruction to a list of one or more first instructions. The list of one or more first instructions may include any suitable instructions. For example, the list of one or more first instructions may include instructions that are expected to result in a change of a state of the first source ES component and a change of a state of the second source ES component. The list may be stored in any suitable location, such as a memory of the first source ES component.

At 620, the second source ES component determines a first value of a configuration setting of the second ES component. The configuration setting may be: an audio configuration setting; a video configuration setting; a channel configuration setting; a software configuration setting; a power configuration setting; or any other suitable type of configuration setting. In some implementations, the first source ES component may determine (or refresh) the first value of the configuration setting in advance of detecting the first instruction. Additionally or alternatively, in some implementations, the first source ES component may repeatedly (e.g., periodically) query the second source ES component in order to maintain a current record of the first value of the configuration setting. At 630, the first instruction is executed, causing the first source ES component to enter the first state, while causing the second source ES component to exit the second state.

At 640, the first source ES component detects a second instruction which, if executed, would cause the first source ES component to exit the first state. The second instruction may be any suitable one or more instructions. For example, the second instruction may be an instruction that, if executed, would cause a first source ES component to power-off. The second instruction may be any instruction that, either directly or indirectly, can cause a change in a state of the second source ES component.

The second instruction may be transmitted to the first source ES component, the rendering ES component, or any other suitable component of the entertainment system. In instances where the instruction is directed to an entertainment system component other than the first source ES component, the first source ES component may detect the instruction by monitoring communications on a communications bus.

In some implementations, a detected instruction may be identified as a second instruction by comparing an identifier for the detected instruction to a list of one or more second instructions. The list of one or more second instructions may include any suitable instructions. For example, the list of one or more second instructions may include instructions that are expected to result in a change of a state of the first source ES component. The list may be stored in any suitable location, such as a memory of the first source ES component or elsewhere.

At 650, the first source ES component generates a third instruction setting the configuration setting (of the second source ES component) whose first value is determined at step 620 to a second value. The second value may be any suitable one or more values. In some implementations, the second value may be determined by the first source ES component based on the first value. The second value may be either equal to or different from the first value.

At 660, the third instruction is transmitted by the first source ES component to the second source ES component. In some implementations, the third instruction may cause the second source ES component to return to the second state or enter a state that is similar to the second state in some aspect. For example, in some implementations, the third instruction may be an instruction for powering-on the second source ES component or changing the channel to which the second source ES component is tuned.

Additionally or alternatively, in some implementations, the transmission (or generation) of the third instruction may be triggered by the detection of the second instruction. In some instances, the third instruction may be transmitted to the second source ES component before (or without) the rendering ES component being configured to use the second source ES component as an active input source. In some implementations, the first source ES component may reconfigure the second source ES component in preparation for a (uncertain) contingency that the second source ES component may become an active input source of the rendering ES component.

The third instruction may be transmitted in any suitable manner. For example, in some implementations, the third instruction may be transmitted as a radio frequency transmission, an infrared transmission, etc. As another example, in some implementations, the third instruction may be transmitted over a communications bus (e.g., a CEC communications bus), a network (e.g., a LAN), or any other suitable bus. The third instruction may be a different type of instruction than the first instruction and/or the second instruction. For example, the third instruction may be an HDMI instruction, whereas the first instruction may be an instruction received from a remote control over an IR port. Alternatively, the first instruction may be also be an HDMI instruction. Thus, each of the first instruction, the second instruction, and the third instruction may be any suitable type of instruction (e.g., an HDMI instruction or an instruction transmitted over a communications network).

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be noted that FIGS. 1-6 are provided as examples only. At least some of the steps of processes 500 and 600 may be performed in a different order than represented, performed concurrently, or omitted. Although in the above examples, rendering ES components are described as ES components that are capable of producing sound and/or video, in other examples any ES component that include an AV switch may be considered a rendering ES component, regardless of whether that ES component can produce sound or video. Thus, in some implementations, rendering components need not include a speaker or a display screen. Although, in the above examples source ES components include a VCR, a DVR, a digital media player, a tuner, and an HTPC, in other examples source ES components may include game consoles, DVD players, CD players, or any other device that is customarily connected to TV sets, amplifiers, or home theater receivers to provide the latter with audio and/or video signal for rendition on a screen or a speaker. Any suitable number of analog or digital AV switches may be present in rendering component 110 or entertainment system 100. Any suitable number of ES components may be connected to any of the AV switches.

The provision of the examples described herein (as well as clauses phrased as "such as," "e.g.", "including" and the like) should not be interpreted as limiting the claimed subject matter to the specific examples; rather, the examples are intended to illustrate only some of many possible aspects.

Although the invention has been described and illustrated in the foregoing illustrative implementations, it is understood that the present disclosed subject matter has been made only by way of example, and that numerous changes in the details of implementation of the invention can be made without departing from the spirit and scope of the invention, which is limited only by the claims which follow. Features of the disclosed implementations can be combined and rearranged in various ways.

What is claimed is:

1. A system for managing an entertainment system, comprising:
   at least one hardware processor configured to:
   detect a first instruction;
   determine a first state of a component of the entertainment system that specifies at least one configuration setting other than a power setting;
   store an indication of the first state after determining the first state of the component;
   detect a second instruction after detecting the first instruction;
   retrieve the indication of the first state that specifies at least one configuration setting other than a power setting when the component is not in the first state; and
   generate a third instruction based on the indication of the first state after retrieving the indication of the first state.

2. The system of claim 1, wherein the at least one hardware processor, in detecting the first instruction, detects an instruction which, when executed, causes the component to stop being in the first state.

3. The system of claim 1, wherein the at least one hardware processor also selects the component based on the component being an active signal source for a rendering component of the entertainment system when the first instruction is detected.

4. The system of claim 1, wherein the at least one hardware processor, in determining the first state:
   transmits a query over a communications bus; and
   receives an indication of a configuration setting of the component in response to the query.

5. The system of claim 1, wherein the at least one hardware processor, in detecting the second instruction, detects an instruction to return the component to the first state.

6. The system of claim 1, wherein the third instruction is for restoring a configuration setting of the component to a value the configuration setting was set to when the first instruction was detected.

7. The system of claim 1, wherein the at least one hardware processor transmits the third instruction over a communications bus.

8. A method for managing an entertainment system, comprising:
   detecting a first instruction;
   determining, using at least one hardware processor, a first state of a component of the entertainment system that specifies at least one configuration setting other than a power setting;
   storing an indication of the first state after determining the first state of the component;
   detecting a second instruction after detecting the first instruction;
   retrieving the indication of the first state that specifies at least one configuration setting other than a power setting when the component is not in the first state; and
   generating a third instruction based on the indication of the first state after retrieving the indication of the first state.

9. The method of claim 8, wherein the detecting the first instruction comprises detecting an instruction which, when executed, causes the component to stop being in the first state.

10. The method of claim 8, further comprising selecting the component based on the component being an active signal source for a rendering component of the entertainment system when the first instruction is detected.

11. The method of claim 8, wherein the determining the first state comprises:
    transmitting a query over a communications bus; and
    receiving an indication of a configuration setting of the component in response to the query.

12. The method of claim 8, wherein the detecting the second instruction comprises detecting an instruction to return the component to the first state.

13. The method of claim 8, wherein the third instruction is for restoring a configuration setting of the component to a value the configuration setting was set to when the first instruction was detected.

14. The method of claim 8, wherein the transmitting the third instruction comprises transmitting the third instruction over a communications bus.

15. A non-transitory computer-readable medium containing computer-executable instructions that, when executed by a processor, cause the processor to perform a method for managing an entertainment system, the method comprising:
    detecting a first instruction;

determining a first state of a component of the entertainment system that specifies at least one configuration setting other than a power setting;

storing an indication of the first state after determining the first state of the component;

detecting a second instruction after detecting the first instruction;

retrieving the indication of the first state that specifies at least one configuration setting other than a power setting when the component is not in the first state; and generating a third instruction based on the indication of the first state after retrieving the indication of the first state.

16. The non-transitory computer-readable medium of claim 15, wherein the detecting the first instruction comprises detecting an instruction which, when executed, causes the component to stop being in the first state.

17. The non-transitory computer-readable medium of claim 15, wherein the method further comprises selecting the component based on the component being an active signal source for a rendering component of the entertainment system when the first instruction is detected.

18. The non-transitory computer-readable medium of claim 15, wherein the determining the first state comprises:
transmitting a query over a communications bus; and
receiving an indication of a configuration setting of the component in response to the query.

19. The non-transitory computer-readable medium of claim 15, wherein the detecting the second instruction comprises detecting an instruction to return the component to the first state.

20. The non-transitory computer-readable medium of claim 15, wherein the third instruction is for restoring a configuration setting of the component to a value the configuration setting was set to when the first instruction was detected.

21. The non-transitory computer-readable medium of claim 15, wherein the transmitting the third instruction comprises transmitting the third instruction over a communications bus.

* * * * *